United States Patent [19]

Chen et al.

[11] Patent Number: 4,590,608
[45] Date of Patent: May 20, 1986

[54] TOPOGRAPHIC FEATURE EXTRACTION USING SENSOR ARRAY SYSTEM

[75] Inventors: Pi-Fuay Chen, Alexandria; William W. Seemuller, Springfield; Frederick W. Rohde, Fairfax Station, all of Va.

[73] Assignee: The United States of America as represented by the Secretary of the Army, Washington, D.C.

[21] Appl. No.: 154,661

[22] Filed: May 30, 1980

[51] Int. Cl.⁴ ............................................. G06K 9/52
[52] U.S. Cl. ..................................... 382/43; 364/727; 382/16
[58] Field of Search ............... 364/514, 515, 521, 522, 364/727, 498; 358/108, 109; 340/146.3 F, 146.3 G, 146.3 P, 17 A; 382/16, 43

[56] References Cited

U.S. PATENT DOCUMENTS 3,527,533  9/1970  Hook et al. ...................... 358/109
3,775,602  11/1973  Alexandridis et al. ............. 364/727
4,032,761  6/1977  Mayo et al. ...................... 364/414
4,052,565  10/1977  Baxter et al. .................... 364/727
4,084,255  4/1978  Casasent et al. .................. 364/515
4,115,806  9/1978  Morton ........................... 364/515
4,192,004  3/1980  Buerger .......................... 364/515

OTHER PUBLICATIONS

Lackey, R. B.; "The Wonderful World of Walsh Functions"; Applications of Walsh Functions-1972 Proc.-held at Catholic Univ.; pp. 2-7.

Venkatesam et al.; "A Walsh Spectral Analyser"; Int. J Electronics; 1979; vol. 46, No. 4, pp. 413-415.

Rao et al.; "Image Data Processing by Hadamard-Haar Transform"; IEEE Trans. on Computers; vol. c-24, No 9, Sep. 1975; pp. 888-896.

Primary Examiner—Errol A. Krass
Attorney, Agent, or Firm—Darrell E. Hollis

[57] ABSTRACT

A method and apparatus for topographic feature extraction by masking a video signal representation of an optical image using a two-dimension Walsh function is disclosed. The optical energy of an image is converted into a video signal. A Walsh function signal in accordance with a two-dimension Walsh is generated. The video signal is multiplied with the Walsh function signal to produce a Walsh transform coefficients signal indicative of the decomposed spectral components of the image. The method and apparatus can further include providing selected topographical feature signals in accordance with the Walsh transform coefficients of selected topographic features. A selected topographical feature can be detected by comparing the Walsh transform coefficients signal with the selected topographical feature signals. The Walsh transform coefficients signal is unique to the selected topographical feature being detected.

105 Claims, 12 Drawing Figures

TOPOGRAPHIC FEATURE EXTRACTION USING SENSOR ARRAY SYSTEM

BACKGROUND OF THE INVENTION

1. Field of the Invention

The present invention relates to topographic pattern recognition systems, and more particularly, to a topographic feature extraction method and apparatus for providing decomposed spectral components of an optical image by multiplying a video signal representation of the optical image by a two-dimension Walsh function. The multiplication produces a Walsh transform coefficients signal that is unique to the topographic feature being detected.

2. Description of the Prior Art

Topographic feature extraction systems are well known in the art. Some systems sense the optical image being examined to produce an electronic signal in accordance with the image being sensed. This electronic signal is digitized so as to allow it to be processed using computer techniques. The computer techniques are employed to attempt to detect selected topographic features from the sensed image. However, such systems exhibit deficiencies in cost, processing time and extraction precision and capability.

OBJECTS OF THE INVENTION

It is an object of the present invention to provide a method and apparatus for topographic feature extraction using a two-dimension Walsh function.

It is another object of the present invention to provide a method and apparatus for providing a Walsh transform coefficients signal indicative of decomposed spectral components of an optical image that is converted into an electronic video signal.

It is a further object of the method and apparatus of the present invention to provide the decomposed spectral components of the image by multiplying the video signal with a Walsh function signal generated in accordance with a two-dimension Walsh function.

It is another object of the method and apparatus of the present invention to provide selected topographical feature signals in accordance with the Walsh transform coefficients of selected topographical features, and to detect a selected topographical feature by comparing the Walsh transform coefficients signal with the selected topographic feature signals.

It is a further object of the method and apparatus of the present invention wherein the significant spectral components of the extracted topographic feature are distributed among the very few low order Walsh transform coefficients of the Walsh transform coefficients signal.

It is another object of the method and apparatus of the present invention wherein the Walsh transform coefficients signal for a selected topographic feature is unique in comparison to the Walsh transform coefficients signals of other selected topographic features.

It is a further object of the method and apparatus of the present invention to be able to detect and recognize a selected set of topographic features by comparing the Walsh transform coefficients signal of the optical image being sensed with the Walsh transform coefficients of selected topographical features.

It is another object of the method and apparatus of the present invention to be able to implement the extraction method in either the program controlled computer arrangement or in the hard wired electronic arrangement.

These and other objects are achieved by the method and apparatus of the present invention as set forth below.

SUMMARY OF THE INVENTION

The method and apparatus of the present invention produces a Walsh transform coefficients signal indicative of the decomposed spectral components of an optical image being sensed. The optical energy of the image being sensed is converted into a video signal. A Walsh function signal is generated in accordance with a two dimension Walsh function. The Walsh transform coefficients signal is produced by multiplying the video signal with the Walsh function signal. This multiplication produces a type of spectral masking. The Walsh transform coefficients signal is unique to the topographic feature being sensed.

The optical image can be converted into the video signal by utilizing a sensor array having a two-dimension array of pixel detector elements. A source of illumination for providing optical energy is disposed with respect to a photo-transparency having the image being sensed so that the optical energy passes therethrough and generates an optical image. An imaging system is used to focus the optical energy onto the two-dimension array of pixel detector elements. The illuminating device can be a source providing substantially white light. The generation of the Walsh function signal and the multiplication of the video signal with the Walsh function signal can be performed either by a computer under stored program control or by a hard wired system.

In the case where the Walsh function signal is generated by a hard wired system, a control signal means can be used for providing a modified clock signal, an end of line signal, and an end of frame signal, which control signal means being under effective control of the video signal stage. An X Walsh function generator means responsive to the modified clock signal and to the end of line signal provides a first pair of output signals. An X decoder means responsive to the first pair of output signals and to the end of frame signal provides a X Walsh signal. A Y Walsh function generator means responsive to the end of line signal and to the end of frame signal provides a second pair of output signals. A Y decoder means responsive to the second pair of output signals provides a Y Walsh signal. Finally, an exclusive OR means having inputs responsive to the X Walsh signal and the Y Walsh signal, respectively, provides as an output the Walsh function signal.

The multiplication of the video signal with the Walsh function signal can be performed in the hard wire form by a modified clock means under control of the video signal converting means. The modified clock means provides a modified clock signal. A first NAND gate means responsive to the modified clock signal, the video signal and the Walsh function signal provides a first digital signal. A first counter means responsive to the first digital signal supplies a first counter signal in accordance with a count of the first digital signal. A first digital to analog converter means that is responsive to the first counter signal provides an analog version of the first counter signal. A second NAND gate means responsive to the modified clock signal, the video signal and the Walsh function signal provides a second digital signal. A second counter means responsive to the second digital signal supplies a second counter signal in accordance with a count of the second digital signal. A second digital to analog converter means responsive to the second counter signal provides an analog version of the second counter signal. Finally, a differential amplifier means responsive to the first and second counter signals provides as an output signal the Walsh transform coefficients signal in accordance with the difference between the first and second counter signals.

The method and apparatus of the present invention can further include storing of the video signal in an electronic memory. Similarly, the present invention can include outputting of the video signal, and outputting of the Walsh transform coefficients signal.

The method and apparatus of the present invention can further include the capability of providing selected topographical feature signals in accordance with the Walsh transform coefficients of selected topographical features, and detection of a selected topographical feature by comparing the Walsh transform coefficients signal with the selected topographical feature signals. This comparison can be done either sequentially or in parallel.

The method and apparatus of the present invention can further include supplying the video signal in accordance with a two-dimension analog array of pixels. The video signal can further be digitized to produce a corresponding two-dimension digital array of pixels. Finally, the digital signal can be thresholded to produce a corresponding two-dimension binary array of pixels.

The method and apparatus of the present invention can detect a selected topographic feature by comparing the Walsh transform coefficients signal with the selected topographical feature signals using a binary to analog correlator.

BRIEF DESCRIPTION OF THE DRAWINGS

FIG. 7B is a table representation of the lower order Walsh transform coefficients of the Walsh transform coefficients signal of the road intersection of FIG. 7A.

DETAILED DESCRIPTION OF THE INVENTION

Figure 1:
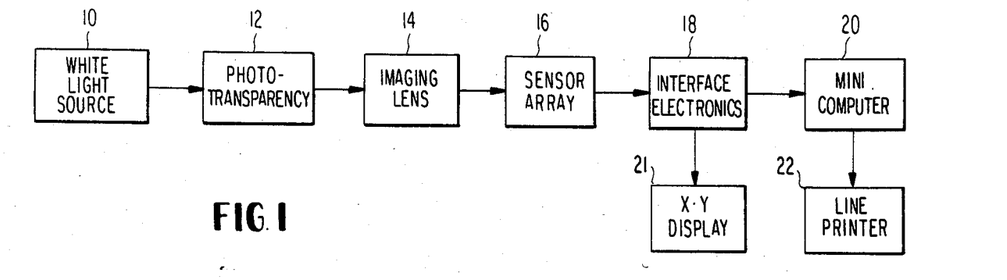
FIG. 1 is a system block diagram of the apparatus for implementing the method of the present invention.

Referring now to FIG. 1, a system block diagram of the apparatus and method of the present invention is shown. A source of illumination 10 provides optical energy. The source 10 can be of any suitable type and can provide illumination of any desired spectral band or bands. Preferably, the source 10 provides substantially white light. However, it should be understood that the apparatus and method of the present invention is not limited to the visible light range.

The optical energy from the white light source is provided to the photo-transparency 12. The photo-transparency 12 can be in any suitable form that will selectively pass the optical energy from the white light source in accordance with the image present on the transparency that is being sensed by the apparatus and method of the present invention. Typically, the photo-transparency 12 is a positive film. Often, the positive film is taken from an aerial station so as to photograph a set of topographical features to be analyzed by the method and apparatus of the present invention. It should be understood, however, that the apparatus and method of the present invention is not limited to aerial topographic feature extraction, but can be used with any extraction or pattern recognition system that provides an image from a photo-transparency.

The optical image corresponding to the image on the photo-transparency is supplied to an imaging system 14. The imaging system 14 can take any suitable form that allows the optical energy to be suitably focused on the detector surface of a sensor array 16, discussed in detail below. The imaging system 14 typically utilizes at least one lens. It encompasses any suitable type of imaging system that can be employed for focusing the optical energy that is passed through the photo-transparency 12.

The sensor array 16 is a signal transducer for converting the optical energy supplied to its detector surface into a suitable video signal. Typically, the sensor array 16 is two-dimensional, and includes a plurality of detector elements, denominated as pixels. The detector elements can be of any suitable shape and dimensions, but typically are squares of substantially equal area. One suitable form for the sensor array 16 is that of a 32×32 element area sensor array, which is of conventional design and is manufactured by the Reticon Corporation of Sunnyvale, Calif. The two-dimensional sensor array is useful because it provides precise element positioning of the array with respect to the gray shade distribution of selected topographical features from aerial photographs that are focused on the detector surface of the array. The sensor array converts the gray shade distribution of selected topographical features from aerial photographs into analog electronic signals. These analog electronic signals, called the video signal in the present invention, are provided by each of the detector elements or pixels of the array 16. These analog signals can be provided in the form of a plurality of parallel signals which can make up the video signal, or conversely can be provided in a serial fashion so as to make up a single video signal. When provided in a serial fashion, it is important that the system know at any given time which detector element or pixel is providing an analog signal at a given moment. This can be provided by the clocking of the sensor array 16 by an internal clocking arrangement, as is conventional in the art. It thus should be understood that the video signal provided by the sensor array 16 of the present invention is not limited to the serial output format, but also contemplates the use of a parallel output format. The preferred form, however, for the video signal is the serial output format.

The video signal is provided to the input of an interface electronics stage 18. An actual configuration for the interface electronics stage 18 is described below with respect to FIG. 5. Basically, the interface electronics stage 18 first digitizes the video signal to produce a corresponding two-dimension digital array of pixel signals. The interface electronic stage 18 then thresholds the video signal so as to produce a corresponding two-dimension binary array of pixel signals.

A X-Y display 21 is connected to the interface electronics stage 18 for displaying on command either or both the two-dimension binary array of pixels or the Walsh transform coefficients signal discussed below. The X-Y display 20 can be of any suitable type for displaying in a desired fashion either or both of the information signals discussed above.

The two-dimension binary array of pixel signals from the interface electronic stage 18 are provided to the input of a mini-computer 20 under stored program control. Mini-computer 20 basically performs the functions of generating a Walsh function signal in accordance with a two-dimension Walsh function. Mini-computer 20 further performs the function of multiplying the video signal in the form of a two-dimension binary array of pixels with the Walsh function signal so as to produce a Walsh transform coefficients signal indicative of the decomposed spectral components of the image being sensed. The actual operation of the multiplication is discussed in detail with respect to FIG. 2 below. Mini-computer 20 can be of any suitable type which can perform the desired functions under stored program control. One suitable form for mini-computer 20 is that of a Hewlett-Packard 2100 mini-computer. It should be understood, however, that the present invention is not limited to this particular type of mini-computer, and any other suitable type of mini-computer can be employed if it can implement the necessary functions of the apparatus and method of the present invention.

A mini-computer 20 provides a Walsh transform coefficients signal indicative of the decomposed spectral components of the image being sensed. It also provides selected topographical feature signals in accordance with the Walsh transform coefficients of selected topographical features. It further detects a selected topographical feature by comparing the Walsh transform coefficients signal with the selected topographical feature signals. This comparison can be performed under stored program control in either a sequential or parallel processing mode.

The Walsh transform coefficients signal as well as the two-dimennsion binary array of pixel signals can be outputted in printed form by mini-computer 20 using a line printer 22 of suitable design. Line printer 22 can be of any type which can provide the information in the suitable printed format.

Figure 2:
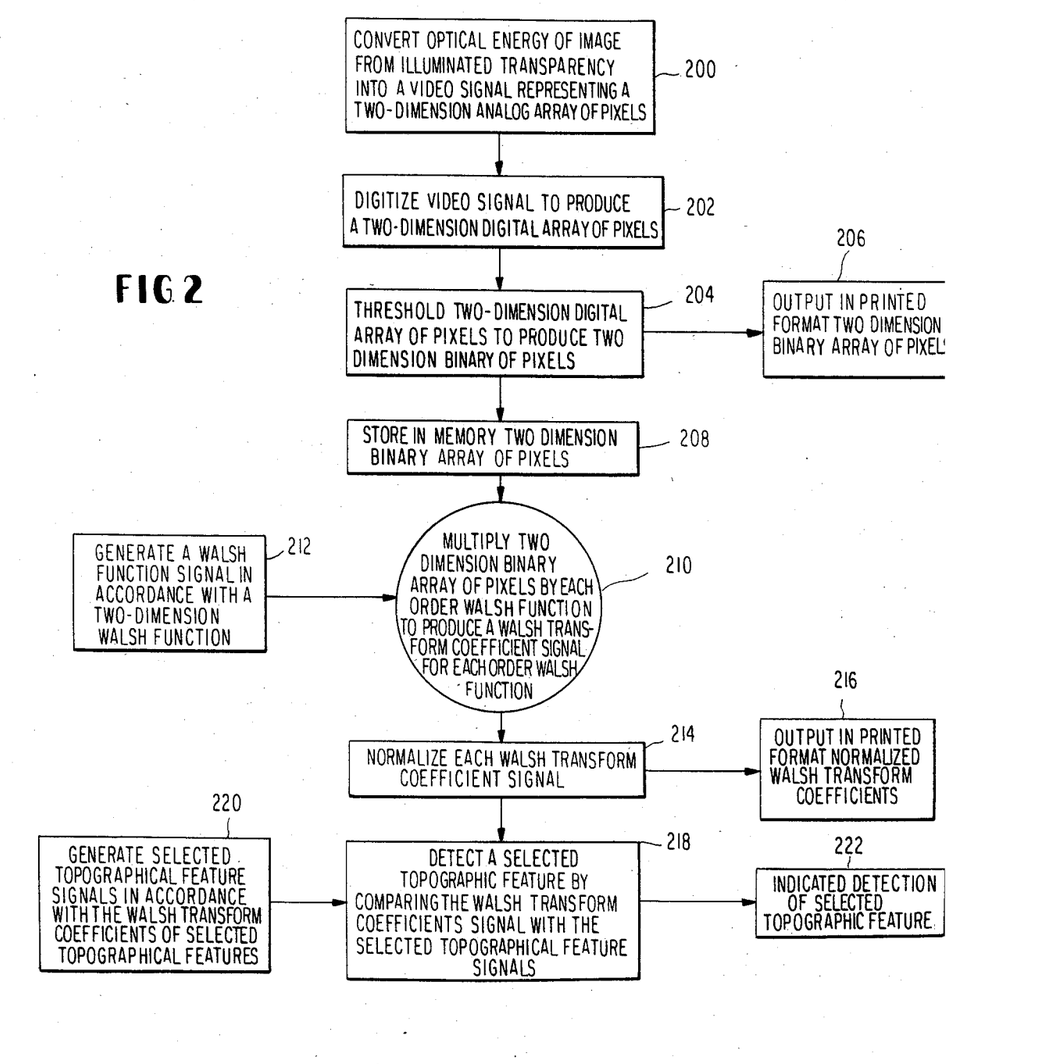
FIG. 2 is a flow chart of the method and operation of the apparatus of the present invention.

Referring now to FIG. 2, the flow chart of the method and the mode of operation of the apparatus of the present invention is shown. The first step is to convert the optical energy of the image of the illuminated transparency into a video signal representing a two-dimension analog array of pixels. The conversion of the optical energy is performed by the sensor array 16 of FIG. 1, discussed above.

The video signal from the block designated by reference numeral 200 is digitized to produce a two-dimension digital array of pixels, as indicated by block 202. The digital value of each of the pixels in the two-dimension array is indicative of the amplitude level of the corresponding analog video signal.

The two-dimension digital array of pixels is thresholded to produce a two-dimension binary array of pixels. The value of the threshold is variable, and provides a very convenient means for isolating signals representing the selected feature image from the unwanted background noise in the gray shade distribution of the selected topographic features from the aerial photographs. For example, the "on" value of the video signal can be arbitrarily set to "100", and the "off" value can be arbitrarily set to "0". The thresholding of the two-dimension digital array of pixels to produce the two-dimension binary array of pixels is indicated by the block designated 204.

The two-dimension binary array of pixels can be outputted, as indicated by the block designated 206. Particularly, the two-dimension binary array of pixels can be printed by a line printer, such as line printer 22, as a two-dimension binary array of pixels which represent the spatial signal signatures of the selected topographic features. For example, in the case where the sensor array 16 is made up of 32×32 pixels, the spatial signal signatures of selected topographic features are shown in FIGS. 7A, 8A and 9A.

Figure 7A:
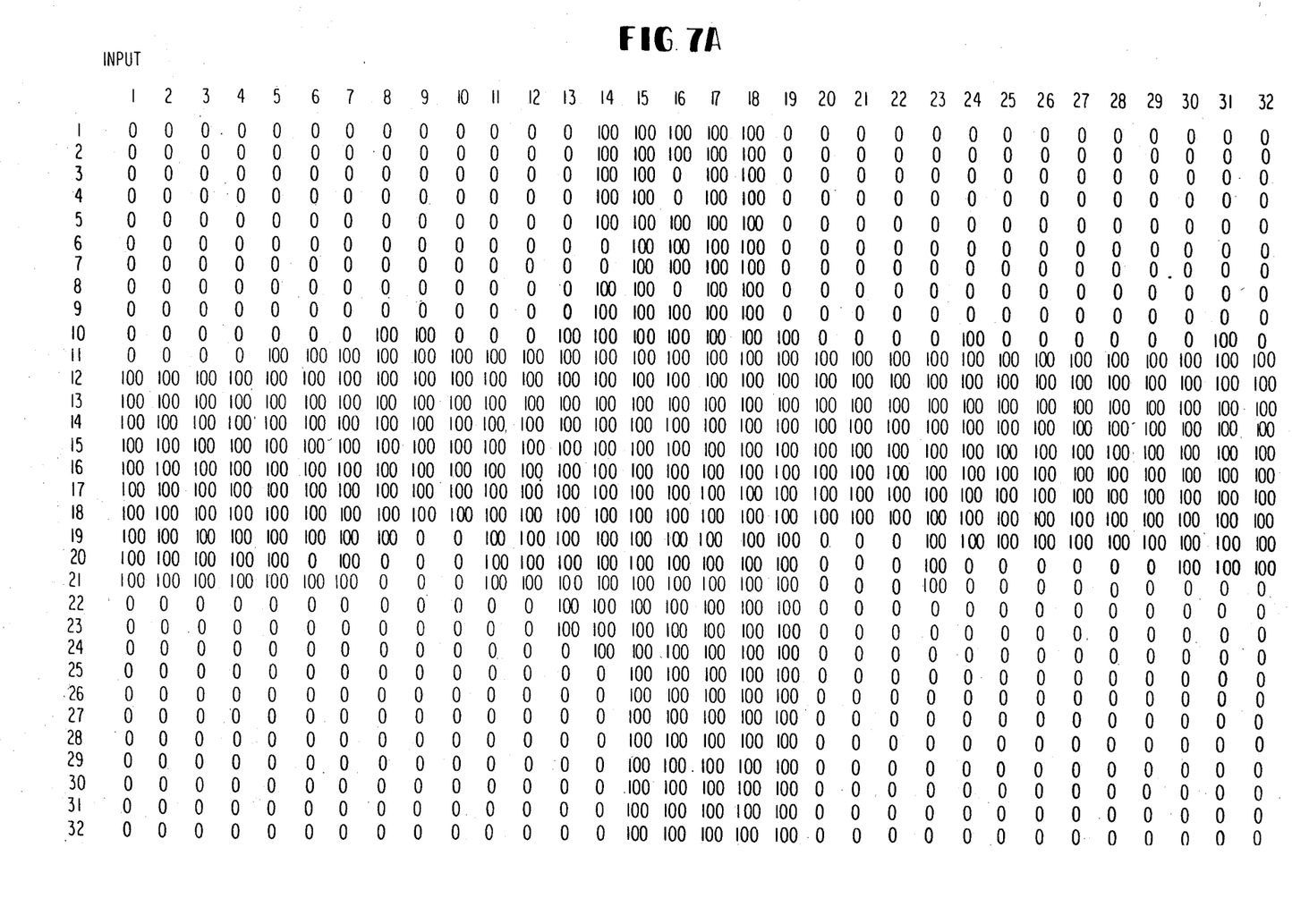
FIG. 7A is a table representation of a two-dimension binary array of pixels of a road intersection.

Referring to FIG. 7A, it is seen that a 32×32 element table of the binary values of a road intersection are shown. Specifically, the road intersection is represented by the "on" values of the video signal, which as stated above are set to be "100". This arrangement occurs because the road intersection contrasts to the surrounding areas sufficiently so that it can be extracted by the threshold operation.

Figure 8A:
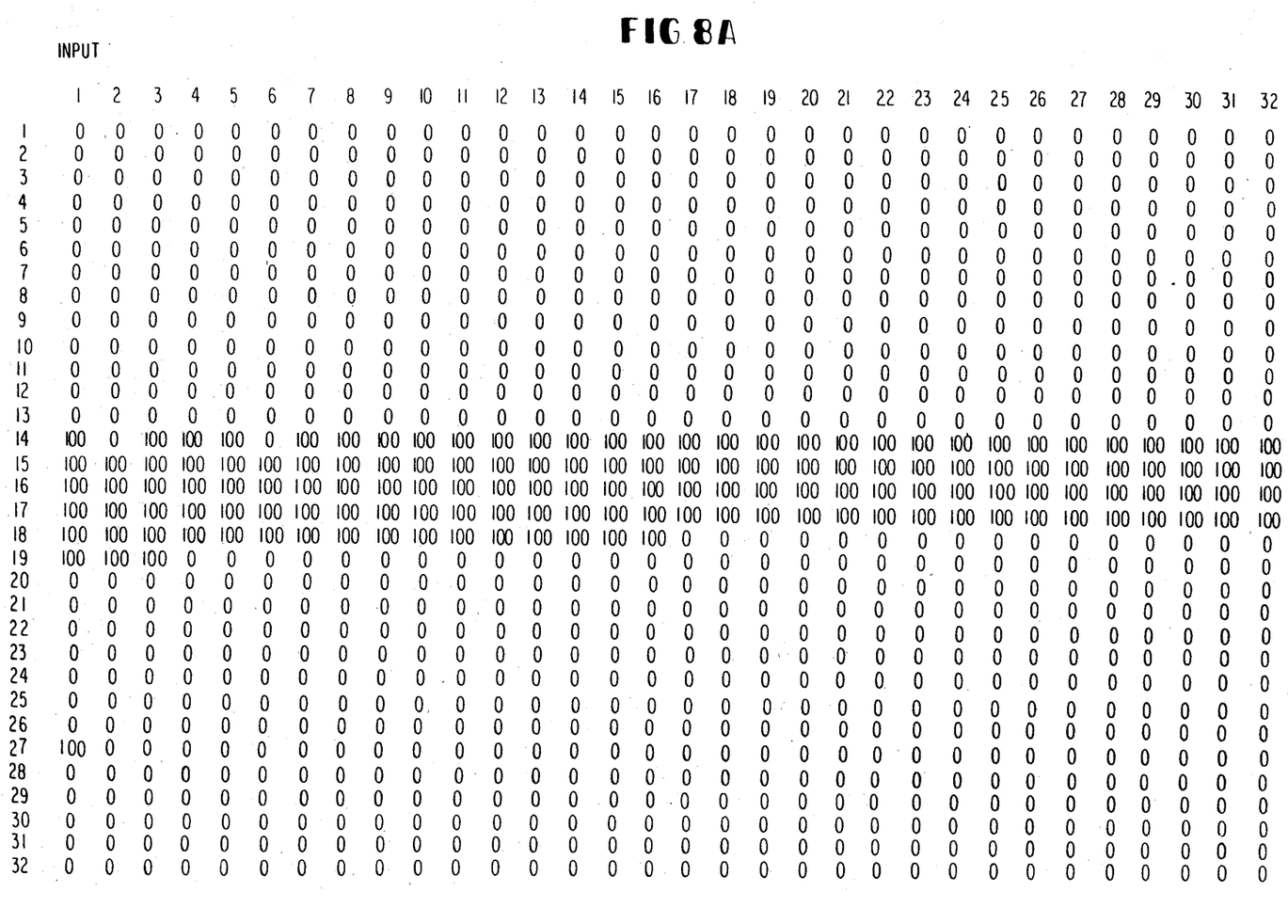
FIG. 8A is a table representation of a two-dimension binary array of pixels of a horizontal line road.
Figure 9A:
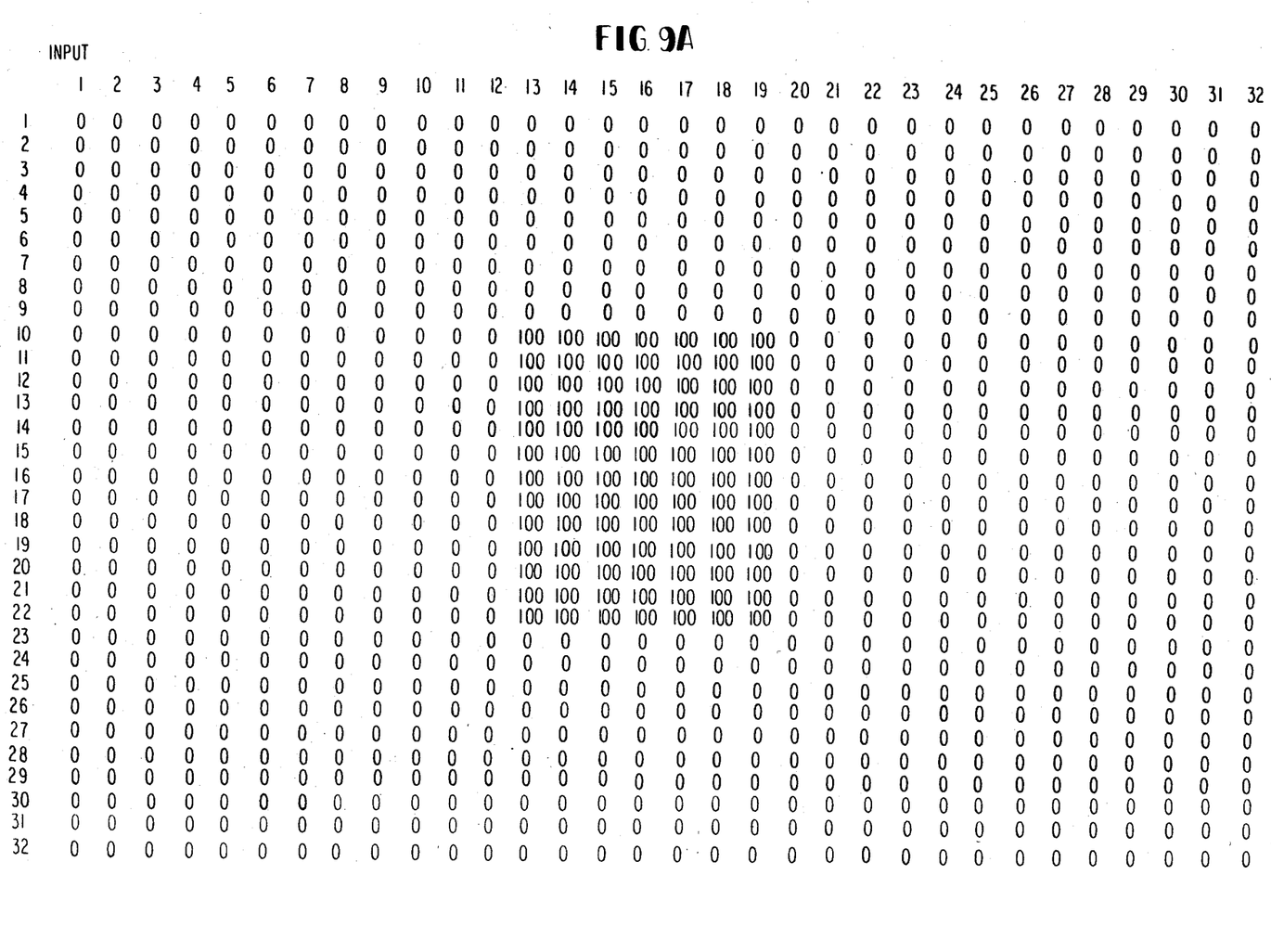
FIG. 9A is a table representation of a two-dimension binary array of pixels of a rectangular object.

Similarly, FIG. 8A shows the spatial signal signature made up of a table of 32×32 values for a horizontal line road. FIG. 9A shows the spatial signal signature of a table of 32×32 elements of a rectangular object. As is the case in FIG. 7A, the horizontal line road of FIG. 8A and the rectangular object of FIG. 9A sufficiently contrasted with the surrounding terrain so that the threshold operation resulted in only this topographical feature being extracted.

The spatial signal signatures, however, do not provide sufficiently unique pattern recognition. The use of the Walsh function of the method and apparatus of the present invention, however, results in spectral masking of the spectral signal signatures, so as to produce decomposed spectral components of the image being sensed which make up a unique identification signature.

Referring again to FIG. 2, the two-dimension binary array of pixels can be stored for later use by the method and apparatus of the present invention, as indicated by the block designated 208. Storage can be accomplished using any conventional approach, such as an electronic memory or disk drive.

The stored two-dimension binary array of pixels can be read out of the storage means and supplied as one of the input signals of the multiplier designated by the circle 210. A Walsh function signal is generated in accordance with a two-dimension Walsh function as shown by block 212. This Walsh function signal is supplied as the second input to the multiplier 210.

Figure 3:
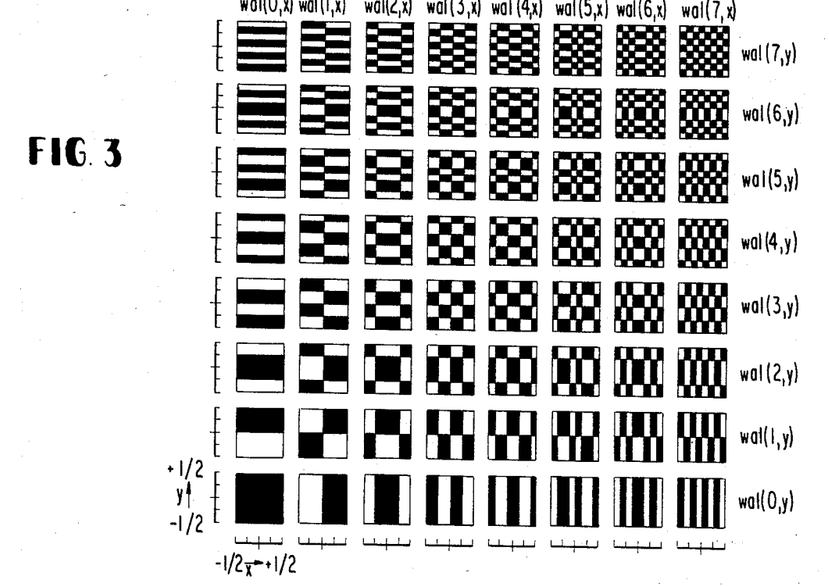
FIG. 3 is a pictorial illustration of the first 8×8 order two-dimension Walsh function.

Referring now to FIG. 3, an illustration of the first 8×8 order of a two-dimension Walsh function is graphically represented. The Walsh function in the lowest lefthand corner, which is denominated as Wal(0,X)Wal(0,Y), is the lowest order Walsh function. It is seen that this Walsh function is represented by a completely black square. It should be understood that a two-dimensional Walsh function has two values: either +1 or −1 in magnitude. +1 is indicated by black, whereas −1 is indicated by white.

Each of the Walsh functions illustrated in FIG. 3 is in actuality divided into 64 areas or pixels of equal area dimensions. In the lowest order Walsh function discussed above, it is seen that each of these 64 pixels is in the +1 state. In comparison, the highest order Walsh function, which is shown in the upper righthand corner of FIG. 3 and is denominated as Wal(7,X)Wal(7,Y) is a checked board of alternating +1 and −1 pixels. The two-dimension Walsh functions between these two extremes exhibit various combinations of +1 and −1 pixels. It should be understood that each of the Walsh functions shown in FIG. 3 represents a particular order of Walsh function. Within each of these particular order Walsh functions, it is seen that they are divided into pixels that are either in the +1 or −1 state.

The Walsh functions shown in FIG. 3 are used as masking devices for masking the spectral signal signatures so as to produce decomposed spectral components of the image being sensed. This masking or decomposition is accomplished by the multiplication of the two-dimension binary array of pixels with each order Walsh function of the two-dimension Walsh function. In other words, the two-dimension binary array of pixels, which is a binary electronic representation of the image being analyzed, is sequentially multiplied by each order Walsh function to produce a Walsh transform coefficient signal for each of the multiplications.

The two-dimension Walsh functions illustrated in FIG. 3 are explained in greater detail in the following text which is incorporated by reference herein: H. F. Harmuth, *Sequency Theory: Foundation and Application*, Academic Press, Inc., 1977. Specifically, pages 55 and 56 discuss the two-dimension Walsh functions shown in FIG. 3.

Returning now to the multiplication of the two-dimension binary array of pixels with each order Walsh function so as to produce a Walsh transform coefficient for each order Walsh function, it should be understood that the multiplication step involves more than a single multiplication of the two-dimension binary array with the particular order Walsh function. Specifically, each pixel of the two-dimension binary array is multiplied by the corresponding pixel value of the particular order Walsh function. The value of the multiplication of each of the pixels from the two-dimension binary array with the corresponding pixels in the particular order Walsh function are summed together, and this sum value is normalized by division so as to produce the Walsh transform coefficient for the particular order Walsh function. In the case where the two-dimension binary array of pixels has the same dimensions as the two-dimension Walsh function, the divisor for producing the normalization is merely a product of the two-dimensions of either the binary array of pixels or the Walsh function. However, it should clearly be understood that the present invention is not limited to the case where the two-dimensions of the binary array of pixels are identical to the two-dimensions of the Walsh function. In contrast, the present invention produces the desired masking function when the two-dimensions of the binary array of pixels are different from the two-dimensions of the Walsh function.

The multiplication discussed above in words, is now set forth in mathematical terms. Specifically, the normalized Walsh transform coefficient for each order Walsh function is given by the term:

$$a(i,j) = \frac{1}{nm} \sum_{k=1}^{m} \sum_{k=1}^{m} f(k,l) Wal(i,k) Wal(j,l). \quad (1)$$

where:
  f(k,1) is the two dimension binary array of pixels;
  Wal(i,k)Wal(j,1) is the two-dimension Walsh function of order i,j; and
  n and m are integers and indicate the size of the two two-dimensions of the Walsh function.

Referring again to FIG. 2, each Walsh transform coefficient, which corresponds to a decomposed spectral component of the image being sensed, is normalized, as indicated by the block labeled 214.

The normalized Walsh transform coefficients signal for a given image can be outputted in printed format, as indicated by the block labeled 216. Referring now to FIG. 7B, the decomposed signal signature of the road intersection is shown in table form. It is noted that the table has 32×32 Walsh transform coefficient values, which correspond to the 32×32 Walsh transform coefficient that was multiplied with the 32×32 binary array of pixels. It is seen that most of the values for the Walsh transform coefficients are zero, while the highest values reside in the very lowest order Walsh transform coefficients. Specifically, it is seen that the value for the lowest order Walsh transform coefficient is 41, which is the highest value in the table. Adjacent lower order Walsh transform coefficients have similar high values. The values for the Walsh transform coefficients shown in FIG. 7B make up a unique decomposed signal signature for the road intersection. This unique decomposed signal signature allows a road intersection to be detected automatically by the method and apparatus of the present invention, as is discussed in detail below.

Figure 8B:
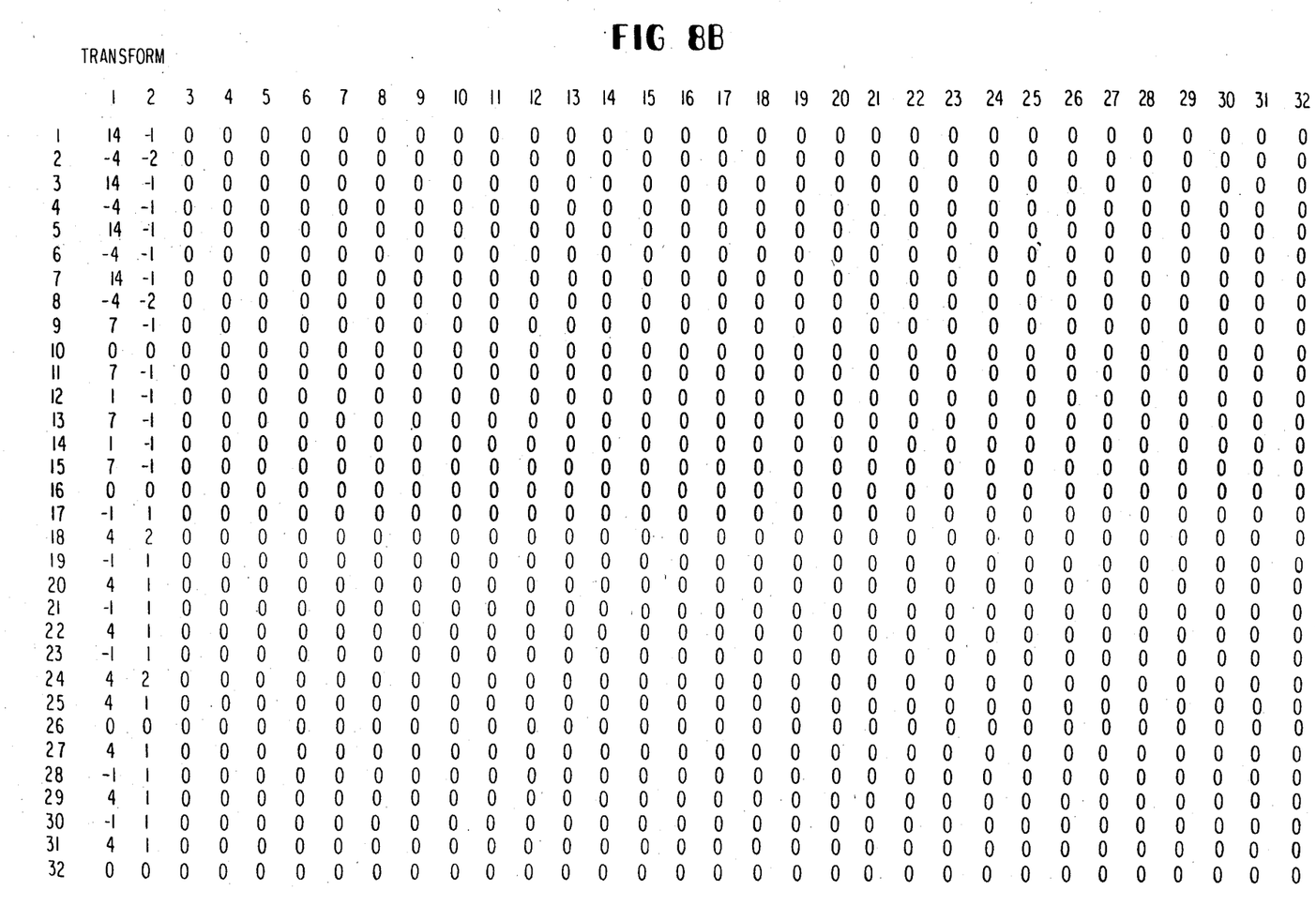
FIG. 8B is a table representation of the lower order Walsh transform coefficients of the Walsh transform coefficients signal of the horizontal line road of FIG. 8A.

Referring now to FIG. 8B, the decomposed signal signature for the horizontal line road is shown. It is also seen that the Walsh transform coefficients for the higher order Walsh transforms are zero, whereas the lower order Walsh transforms have high values. The values shown in FIG. 8B also make up a unique decomposed signal signature for the horizontal line road, allowing the horizontal line road to be detected automatically by the method and apparatus of the present invention as discussed below.

Figure 9B:
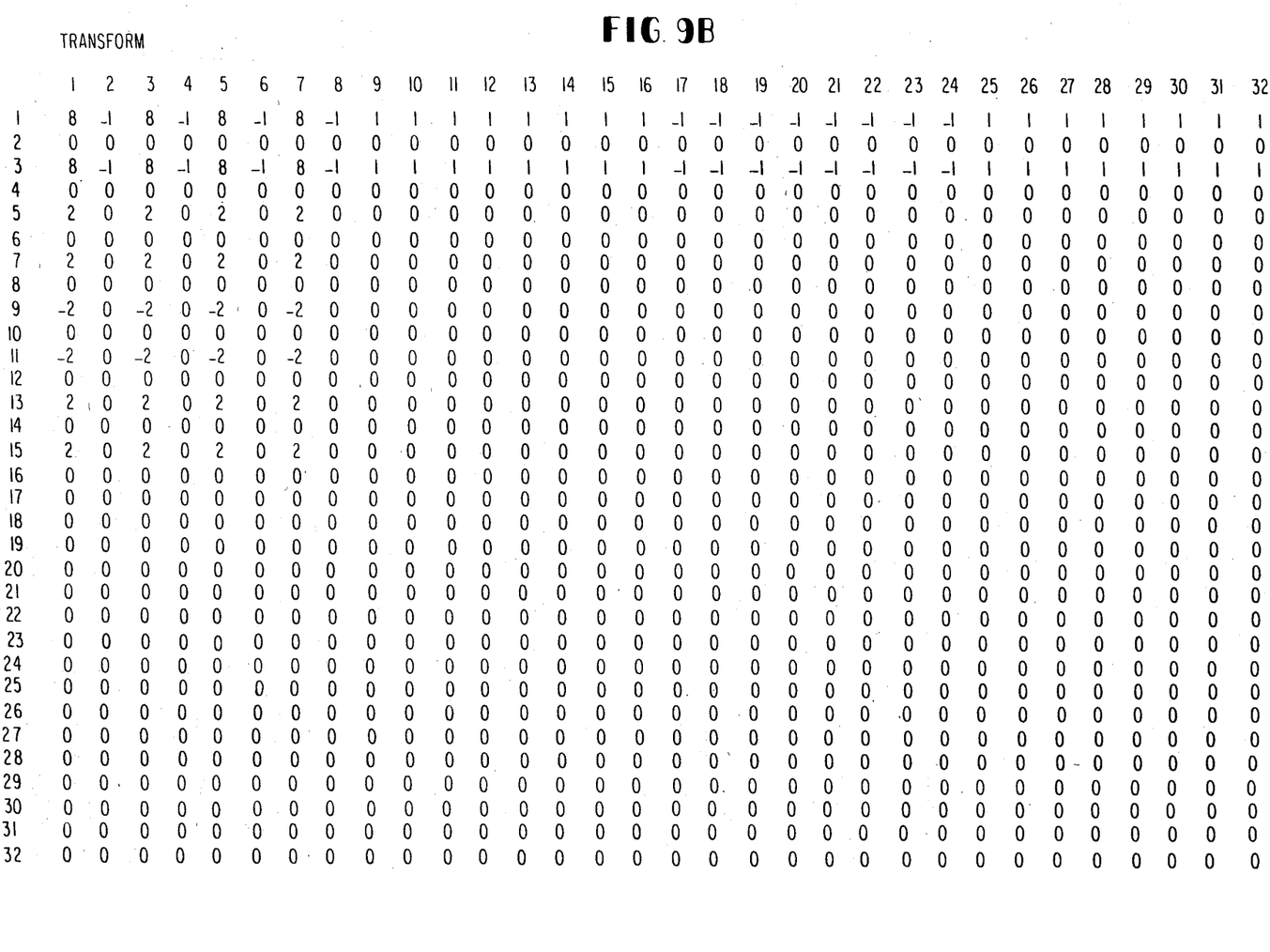
FIG. 9B is a table representation of the lower order Walsh transform coefficients of the Walsh transform coefficients signal of the rectangular object of FIG. 9A.

Referring now to FIG. 9B, the decomposed signal signature of the rectangular object is shown. It is also seen in this table that most of the higher order Walsh transform coefficients have zero values, whereas the lower order Walsh transform coefficients have high values. This table of FIG. 9B also shows a unique decomposed signal signature of the rectangular object, which allows the method and apparatus of the present invention to recognize automatically the rectangular object.

Other selected topographical features have their own unique decomposed signal signature and are included within the scope of the present invention. Referring again to FIG. 2, the Walsh transform coefficients signal is provided as one input to the block labeled 218. Selected topographical feature signals in accordance with the Walsh transform coefficients of selected topographical features are generated by the block labeled 220. These selected topographical feature signals are provided as the second input to the block 218. A selected topographical feature signal is provided as the second input to the block 218. A selected topographical feature is detected automatically by the method and apparatus of the present invention by comparing the Walsh transform coefficients signal with the selected topographical feature signals. This comparison can be done either in parallel or sequentially. The preferred form for the present invention is that of sequential comparison. The highest comparison signal indicates that the image being analyzed is closest to the selected topographic feature, as indicated by the block diagram labeled 222. It is thus seen that the method and apparatus of the present invention allows for automatic detection of selected topographic features.

The system block diagram of the present invention shown in FIG. 1 is one having a computer under stored program control. This is preferred because it allows maximum flexibility in terms of modifying the operation of this system so as to be able to detect newly selected topographical features. However, the method and apparatus of the present invention clearly contemplates specific hard wired variations which are tailored to recognize a selected set of topographic features. The hard wired systems are advantageous both because of reduced cost and because of higher operating speed.

Figure 4:
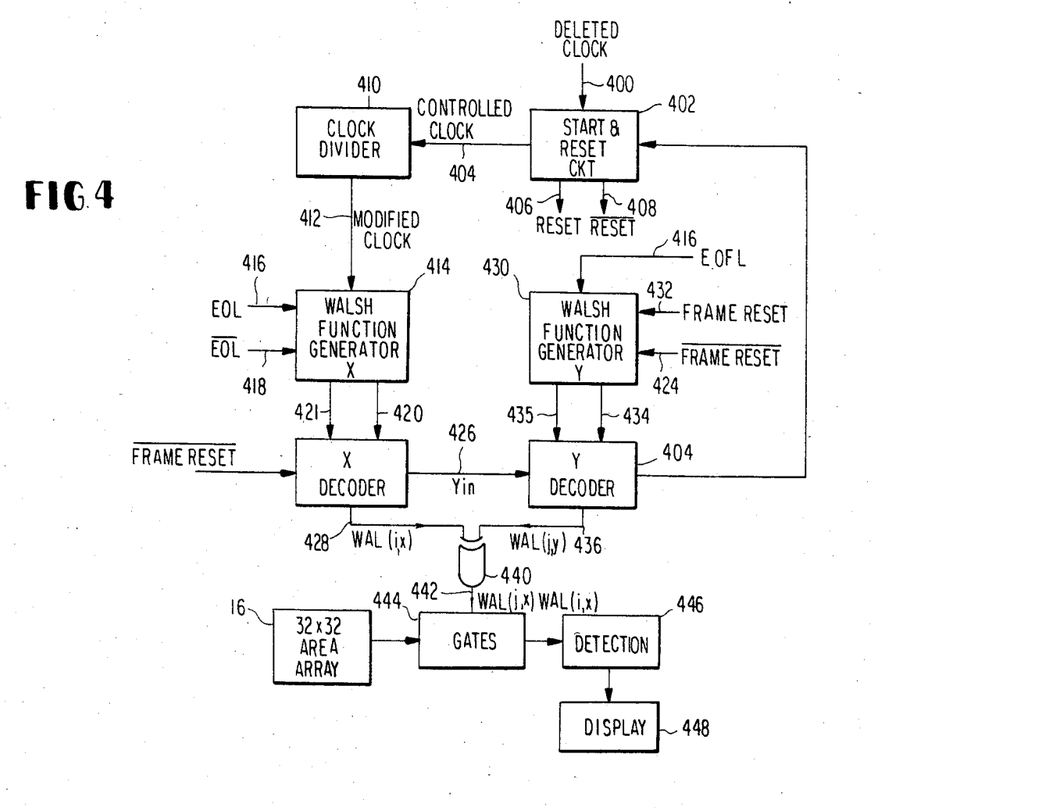
FIG. 4 is a block diagram of one embodiment of the Walsh function generator used in the present invention.

Referring now to FIG. 4, a block diagram of a hard wired Walsh function generator is shown. A deleted clock signal 400 from the clock of the sensor array 16 is provided as an input to a start and reset circuit 402. Similarly, an output signal from a Y decoder 404 is provided a a second input signal to the start and reset circuit 402. The start and reset circuit 402 provides a controlled clock signal on a $\overline{\text{line}}$ 404. It also provides a reset signal on a line 406 and a $\overline{\text{reset}}$ signal on a line 408.

The controlled clock signal on line 404 is provided to a clock divider circuit 410. The clock divider circuit is of conventional design, and provides a modified clock signal on a line 412 in accordance with the controlled clock signal on line 404.

The modified clock signal 412 is provided as an input to a X Walsh function generator circuit 414. An end of line (EOL) signal on a line 416, which is also provided effectively by the sensor array 16 of FIG. 1, is provided as an input signal to the X Walsh function generator 414. Similarly, a $\overline{\text{EOL}}$ signal on a line 418 is provided as an input to the X Walsh function generator 414.

The X Walsh function generator 414 provides a first pair of output signals indicative of the Walsh function generated thereby. These first pair of output signals on lines 420 and 421 are provided as inputs to a X decoder 422. A $\overline{\text{FRAME}}$ reset signal on a line 424, which is supplied effectively by the sensor array circuit 16 of FIG. 1, is also provided as an input to the X decoder 422. The X decoder 422 provides a Yin signal on a line 426. In addition, the X decoder circuit 422 provides a WAL(i,x) signal as an output on line 428.

A Y Walsh function generator 430 is supplied by an end of line signal on line 416. In addition, the Y Walsh function generator is provided with a $\overline{\text{FRAME}}$ reset signal on a line 430, which is provided effectively by the sensor array 16 of FIG. 1. A $\overline{\text{FRAME}}$ reset is supplied to the Y Walsh function generator 430 by line 424.

The Y Walsh function generator 430 provides a second pair of output signals on lines 434 and 435 which are indicative of the Walsh function. This second pair of output signals on lines 434 and 435 are supplied as input to a Y decoder 404. The Y decoder 404 provides the Y Walsh function signal, WAL(j,y) on a line 436. The X Walsh function WAL(i,x) on line 428 and the Y Walsh function WAL(j,y) on line 436 are supplied as the respective two inputs to an exclusive OR gate 440. The exclusive OR gate 440 acts to convert the X Walsh signal and the Y Walsh signal into a two-dimensional Walsh function on a line 444. The two-dimensional Walsh function is indicated as WAL(j,y)WAL(i,x). The two-dimensional Walsh function is provided as an input to a set of gates 444, which are also supplied with the output of the 32×32 area array 16. These two signals are multiplied by the gates 444 in the manner stated above, and the output from the gates 444 are supplied to a detection stage 446, and thereafter to a display stage 448.

Figure 5:
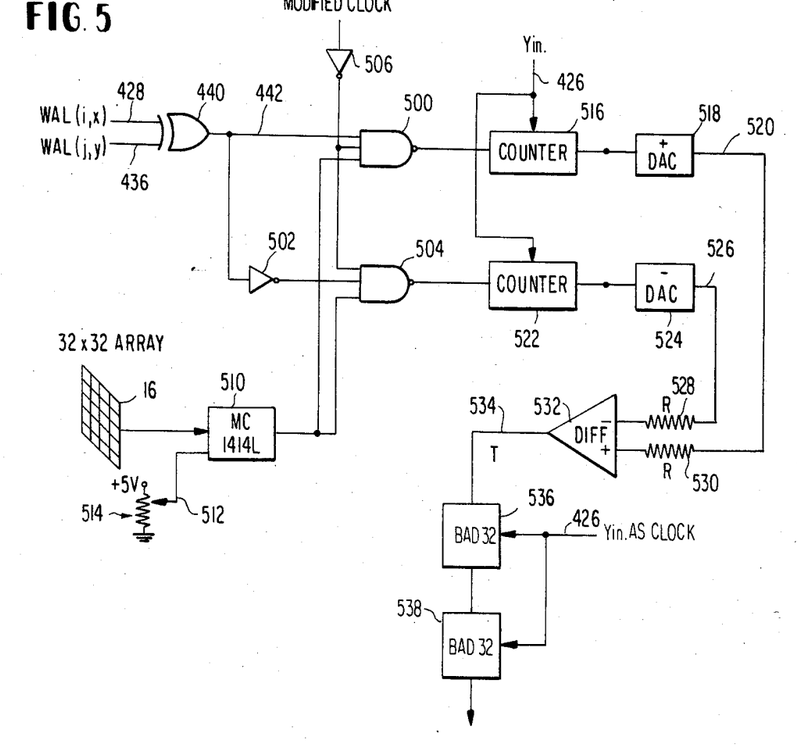
FIG. 5 is another system block diagram of the apparatus for implementing the method of the present invention.

Referring now to FIG. 5, a hard wire version of the method and apparatus of the present invention is shown. The WAL(i,x) signal on line 428 and the WAL(j,y) signal on line 436 are provided as the two inputs to an exclusive OR gate 440 in the manner stated above with respect to FIG. 4. The output of the exclusive OR gate 440 on line 442 is the two-dimension Walsh function. This two-dimension Walsh function is supplied as a first input to a NAND gate 500, and is inverted by an inverter 502 and then supplied to a first input of an NAND gate 504. The modified clock signal which is derived effectively from the gray sensor 16 is inverted by an inverter 506 and supplied as the second input to the NAND gate 500 and the second input of the NAND gate 504 to act as a clocking signal. The analog video signal from the 32×32 array 16 is supplied via a line 508 to the input of a threshold stage 510. The level of the selected threshold is set by the arm 512 of the potentiometer 514. It is seen that the threshold level is variable and can be preselected. The threshold stage 510 is of conventional design, and can be an MC1414L by Motorola of Phoenix, Az. The thresholded binary video signal from the output of the threshold stage 510 is supplied as the third inputs of the NAND gates 500 and 504.

The output of the NAND gate, which is a digital signal, is supplied as an input to a counter 516. Counter 516 is reset by the Yin signal of line 426 of FIG. 4. The output of counter 516, which corresponds to the count of the digital signals supplied by the output of the NAND gate 500 during the period specified by the Yin signal on line 426 is supplied as the input of the digital to analog converter 518. Digital to analog converter 518 converts the digital output signal from counter 516 to a corresponding analog signal, which appears on a line 520. Counter 516 and digital to analog counter 518 are of conventional design.

Similarly, the output of the NAND gate 504 is supplied as the input to a counter 522. Counter 522 is also reset by Yin signal on line 426. The output of counter 522 is supplied to the input of a digital to analog converter 524, which provides an analog output signal on 526 having a value in accordance with the digital signal provided by the output of counter 522. Counter 522 and digital to analog converter 524 are of conventional design.

The difference between the analog signals on lines 520 and 526 is determined after proper scaling by resistors 528 and 530 by a differential amplifier 532. Specifically, the negative input of the differential amplifier 532 is connected via the scaling resistor 528 to the output of the digital analog converter 526, whereas the positive output of the differential amplifier 532 is connected via the scaling resistor 530 to the output of the digital to analog converter 518. The output from the differential amplifier 532 is the Walsh transform coefficients signal indicative of the decomposed spectral components of the image being sensed. This output signal from the differential amplifier 532 is provided to an output line 534.

As stated above, the method and apparatus of the present invention can automatically detect the presence of a selected topographical feature by comparing the Walsh transform coefficients signal with the selected topographical feature signal. The Walsh transform coefficients signal on line 532 is provided to a pair of cascaded 32×32 stage binary to analog correlators 536 and 538. The binary to analog correlators are of conventional design and can be obtained from the Reticon Corporation of Sunnyvale, Calif. Specifically, attention is directed to Technical Note 106 by V. Strasilla, entitled "A Programmable Binary-Analog Correlator", which is published by the Reticon Corporation of Sunnyvale, Calif., and is incorporated by reference herein. The binary to analog correlators are clocked by the Yin signal on line 426.

Figure 6:
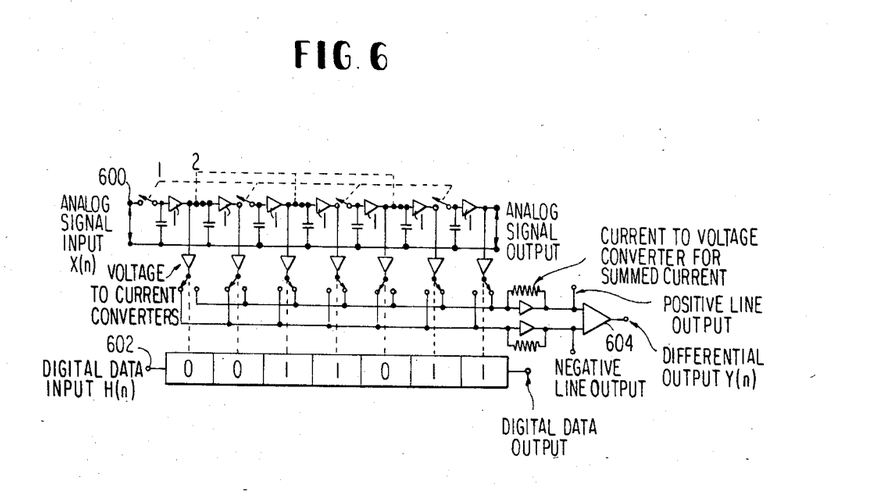
FIG. 6 is a schematic block diagram of a detector utilizing a binary to analog correlator of conventional design.

Referring now to FIG. 6, a portion of a binary to analog correlator of the type designated 536 or 538 of FIG. 5 is shown. It is sufficient to note that the Walsh transform coefficients signal on line 534 is provided to input 600, whereas the Walsh function signal is supplied to the digital data input 602.

It is seen that this significant spectral components in most cases appear in the first 8×8 lower order Walsh transform coefficients. Thus, two cascaded 32-state binary-analog correlators 536 and 538 should be sufficient to detect the important coefficients to yield recognizable results. The Walsh transform coefficients are fed into the input of the analog delay line, and the binary pattern which represents known features will be connected to the input of the static shift register. Each stage of the analog delay line has a pair of taps. These taps have switches in series with them which are controlled by the true and complement outputs of the static shift register. By loading a binary word into the static shift register, it selects the taps which are connected to two output lines, thus providing the ability to do the correlation. By sweeping known binary words at megahertz rates, the Walsh coefficients representing a particular type of feature which is quickly detected in the output of the operational amplifier, labeled 604.

It should be appreciated that other apparatus can be used for detecting the presence of a selected topographical feature, and the present invention is not limited to the binary to analog correlator shown and described with respect to FIGS. 5 and 6.

Thus, the apparatus and method of the present invention allow for automatic detection of selected topographical features by comparing the Walsh transform coefficients signal with the selected topographical feature signals.

We claim as our invention:

1. Apparatus comprising:
    a. means for converting optical energy of an image into a video signal;
    b. means for generating a Walsh function signal in accordance with the equation:

$$a(i,j) = \frac{1}{nm} \sum_{k=1}^{n} \sum_{l=1}^{m} f(k,l) Wal(i,k) Wal(j,l),$$

where: a(i,j) is said Walsh transform coefficients signal; i and j indicate the order of said Walsh function signal; and n and m are integers; and f(k,1) is said video signal; and
    c. means for multiplying said video signal with said Walsh function signal to produce a Walsh transform coefficient signal indicative of the decomposed spectral components of said image.

2. The apparatus as recited in claim 1, wherein said generating means comprises:
    control signal means for providing a modified clock signal, an end of line signal, and an end of frame signal under effective control of said converting means;
    X Walsh function generator means responsive to said modified clock signal and said end of line signal for providing a first pair of output signals;
    X decoder means responsive to said first pair of output signals and said end of frame signal for providing an X Walsh signal;
    Y Walsh function generator means responsive to said end of line signal and said end of frame signal for providing a second pair of output signals;
    Y decoder means responsive to said second pair of output signals for providing a Y Walsh signal; and
    exclusive OR means having inputs responsive to said X Walsh signal and said Y Walsh signal, respectively, for providing at an output said Walsh function signal.

3. The apparatus as recited in claim 1, wherein said multiplying means includes a plurality of electronic gates.

4. The apparatus as recited in claim 1, wherein said multiplying means includes:
    modified clock means under control of said converting means for providing a modified clock signal;
    first NAND gate means responsive to said modified clock signal, said video signal and said Walsh function signal to provide a first digital signal;
    first counter means responsive to said first digital signal for supplying a first counter signal in accordance with a count of said first digital signal;
    first digital to analog converter means responsive to said first counter signal for providing an analog version of said first counter signal;
    second NAND gate means responsive to said modified clock signal, said video signal and said Walsh function signal to provide a second digital signal;
    second counter means responsive to said second digital signal for supplying a second counter signal in accordance with a count of said second digital signal;
    second digital to analog converter means responsive to said second counter signal for providing an analog version of said second counter signal; and
    differential amplifier means responsive to said first and second counter signals for providing as an output said Walsh transform coefficients signal in accordance with the difference between said first and second counter signals.

5. The apparatus as recited in claim 4, further comprising:
   means for providing selected topographical feature signals in accordance with the Walsh transform coefficients of selected topographical features; and
   binary to analog converter means responsive to said Walsh transform coefficients signal and said selected topographical features signals to detect a selected topographical feature.

6. The apparatus as recited in claim 1. wherein said converting means comprises:
   a. sensor array means having a two-dimension array of pixel detector elements for providing said video signal;
   b. illuminating means for providing optical energy;
   c. a photo-transparency disposed so that said optical energy passing therethrough generates an optical image; and
   d. imaging means for focusing said optical image onto said two-dimension array of pixel detector elements.

7. The apparatus as recited in claim 6, wherein said pixel detector elements have substantially the same area.

8. The apparatus as recited in claim 6, wherein said illuminating means is a source providing substantially white 9. Apparatus, which comprises:
   a. means for converting optical energy of an image into a video signal;
   b. means for generating a Walsh function signal in accordance with a two-dimension Walsh function;
   c. means for multiplying said video signal with said Walsh function signal to produce a Walsh transform coefficients signal indicative of the decomposed spectral components of said image;
   d. means for providing selected topographical feature signals in accordance with the Walsh transform coefficients of selected topographical features; and
   e. means for detecting a selected topographical feature by comparing said Walsh transform coefficients signal with said selected topographical feature signals.

10. The apparatus as recited in claim 9, wherein said generating means, said multiplying means, said providing means, and said detecting means are provided by a computer under stored program control.

11. The apparatus as recited in claim 9, wherein said converting means supplies said video signal in accordance with a two dimension analog array of pixels.

12. The apparatus as recited in claim 11, wherein said converting means includes means for digitizing said video signal to produce a corresponding two-dimension digital array of pixels.

13. The apparatus as recited in claim 12, wherein said converting means further includes means for thresholding said video signal to produce a corresponding two-dimension binary array of pixels.

14. The apparatus as recited in claim 13, further comprising means responsive to said video signal for outputting said two-dimension binary array of pixels.

15. The apparatus as recited in claim 9, wherein said detecting means is a binary to analog correlator having inputs responsive to said Walsh transform coefficients signal and said selected topographical feature signals.

16. A method comprising the steps of:
   a. converting optical energy of an image into a video signal using a sensor array with a two-dimensional analog array of pixels;
   b. generating a Walsh function signal in accordance with a two-dimension Walsh function;
   c. multiplying said video signal with said Walsh function signal to produce a Walsh transform coefficients signal indicative of the decomposed spectral components of said image.

17. The method as recited in claim 16, wherein said video signal is digitized to produce a corresponding two-dimension digital array of pixels.

18. The method as recited in claim 17, wherein said video signal corresponding to said two-dimension digital array of pixels is thresholded to produce a corresponding two-dimension binary array of pixels.

19. The method as recited in claim 18, further comprising the step of outputting said video signal corresponding to said two-dimension binary array of pixels.

20. The method as recited in claim 19, further comprising the step of storing said video signal corresponding to said two-dimensional binary array of pixels.

21. The method as recited in claim 20, wherein said step of storing utilizes an electronic memory.

22. The method as recited in claim 1, wherein said selected topographical features are substantially linear.

23. The method as recited in claim 18, wherein said tresholding is performed at a selected signal value to reduce image background noise.

24. The method as recited in claim 23, wherein said video signal of step c is in accordance with said two-dimension binary array of pixels.

25. The method as recited in claim 24, wherein said two-dimension Walsh function of step b has at least two orders.

26. The method as recited in claim 25, wherein said multiplying of step c is performed by multiplying said video signal in accordance with said two-dimension binary array pixels by said Walsh function signal in accordance with each of said orders of said two-dimension Walsh function to provide said Walsh transform coefficients signal having a Walsh transform coefficients signal having a Walsh transform coefficient for each of said orders.

27. The method as recited in claim 26, further comprising the step of normalizing each of said Walsh transform coefficients of said Walsh transform coefficients signal.

28. The method as recited in claim 26, further comprising the step of outputting said Walsh transform coefficients signal.

29. The method as recited in claim 26, wherein said Walsh transform coefficients of said Walsh transform coefficients signal are arranged in a two-dimension array format.

30. A method comprising the steps of:
   a. converting an optical image into a video signal;
   b. generating a Walsh function signal in accordance with a two-dimension Walsh function;
   c. multiplying said video signal with said Walsh function signal to produce a Walsh transform coefficients signal indicative of the decomposed spectral components of said image;
   d. providing selected topographical feature signals in accordance with the Walsh transform coefficients of selected topographical features; and e. detecting a selected topographical feature by comparing said Walsh transform coefficients signal with said selected topographical feature signals.

31. The method as recited in claim 30, wherein step a is performed by using an area sensor array having optical energy of an image from an illuminated transparency focused on the detecting surface thereof.

32. The method as recited in claim 31, wherein said optical energy of step a is substantially in the visible range.

33. The method as recited in claim 31, wherein said area sensor array supplies said video signal in accordance with a two dimensional analog array of pixels.

34. The method as recited in claim 33, wherein said two-dimensions of said two-dimension Walsh function are substantially equal in number to the two-dimensions of said two-dimension binary array of pixels.

35. The method as recited in claim 33, wherein said video signal is digitized to produce a corresponding two-dimension digital array of pixels.

36. The method as recited in claim 35, wherein said video signal corresponding to said two-dimension digital array of pixels is thresholded to produce a corresponding two-dimension binary array of pixels.

37. The method as recited in claim 36, wherein said thresholding is performed at a selected signal level to reduce image background noise.

38. The method as recited in claim 36, wherein said video signal of step c is in accordance with said two-dimension binary array of pixels.

39. The method as recited in claim 38, wherein step c provudes said Walsh transform coefficients signal in accordance with $$a(i,j) = \frac{1}{nm} \sum_{k=1}^{n} \sum_{l=1}^{m} f(k,l) Wal(i,j) Wal(j,l),$$

where: a(i,j) is said Walsh transform coefficients signal; i and j indicate the order of said two-dimension Walsh function; n and m are integers; and f(k,l) is said two-dimension binary array of pixels.

40. The method as recited in claim 38, wherein said two-dimension Walsh function has at least two orders; and
wherein said multiplying of step c is performed by multiplying said video signal in accordance with said two-dimension binary array of pixels by said Walsh function signal in accordance with each of said orders of said two-dimension Walsh function to provide said Walsh transform coefficients signal having a Walsh transform coefficient for each of said orders.

41. The method as recited in claim 36, wherein said two-dimension Walsh function has at least two orders.

42. The method as recited in claim 30 further comprising the step of normalizing said Walsh transform coefficients signal.

43. The method as recited in claim 30, further comprising the step of storing in an electronic memory said video signal.

44. The method as recited in claim 30, further comprising the step of outputting said Walsh transform coefficients signal.

45. The method as recited in claim 30, wherein step e is performed by a binary-analog correlator.

46. The method as recited in claim 30, wherein steps b and e are performed by a computer under stored program control.

47. The method as recited in claim 46, wherein said computer is digital.

48. Apparatus, which comprises:
 a. means for converting optical energy of an image into a video signal including
  (1) sensor array means having a two-dimension array of pixel detector elements for providing said video signal,
  (2) illuminating means for providing optical energy,
  (3) a photo-transparency disposed so that said optical energy passsing therethrough generates an optical image, and
  (4) imaging means for focusing said optical image onto said two-dimension array of pixel detector elements;
 b. means for generating a Walsh function signal in accordance with a two-dimension Walsh function; and
 c. means for multiplying said video signal with said Walsh function signal to produce a Walsh transform coefficients signal indicative of the decomposed spectral components of said image.

49. The apparatus as recited in claim 48, wherein said pixel detector elements have substantially the same area.

50. The apparatus as recited in claim 48, wherein said illuminating means is a source providing substantially white light.

51. The apparatus as recited in claim 48, wherein said generating means and said multiplying means are provided by a computer under stored program control.

52. The apparatus as recited in claim 61, wherein said computer is digital.

53. The apparatus as recited in claim 46, wherein said Walsh transform coefficients signal is in accordance with the equation:

$$a(i,j) = \frac{1}{nm} \sum_{k=1}^{n} \sum_{l=1}^{m} f(k,l) Wal(i,k) Wal(j,l),$$

where: a(i,j) is said Walsh transform coefficients signal; i and j indicate the order of said Walsh function signal; and n and m are integers; and k(f,1) is said video signal.

54. The apparatus as recited in claim 48, wherein said generating means comprises:
 control signal means for providing a modified clock signal, an end of line signal, and an end of frame signal under effective control of said converting means;
 X Walsh function generator means responsive to said modified clock signal and said end of line signal for providing a first pair of output signals;
 X decoder means responsive to said first pair of output signals and said end of frame signal for providing an X Walsh signal;
 Y Walsh function generator means responsive to said end of line signal and said end of frame signal for providing a second pair of output signals;
 Y decoder means responsive to said second pair of output signals for providing a Y Walsh signal; and
 exclusive OR means having inputs responsive to said X Walsh signal and said Y Walsh signal, respectively, for providing at an output said Walsh function signal.

55. The apparatus as recited in claim 48, wherein said multiplying means includes a plurality of electronic gates.

56. The apparatus as recited in claim 48, wherein said multiplying means includes:
modified clock means under control of said converting means for providing a modified clock signal;
first NAND gate means responsive to said modified clock signal, said video signal and said Walsh function signal to provide a first digital signal;
first counter means responsive to said first digital signal for supplying a first counter signal in accordance with a count of said first digital signal;
first digital to analog converter means responsive to said first counter signal for providing an analog version of said first counter signal;
second NAND gate means responsive to said modified clock signal, said video signal and said Walsh function signal to provide a second digital signal;
second counter means responsive to said second digital signal for supplying a second counter signal in accordance with a count of said second digital signal;
second digital to analog converter means responsive to said second counter signal for providing an analog version of said second counter signal; and
differential amplifier means responsive to said first and second counter signals for providing as an output said Walsh transform coefficients signal in accordance with the difference between said first and second counter signals.

57. The apparatus as recited in claim 56, further comprising:
means for providing selected topographical feature signals in accordance with the Walsh transform coefficients of selected topographical features; and
binary to analog converter means responsive to said Walsh transform coefficients signal and said selected topographical features signal to detect a selected topographical feature.

58. The apparatus as recited in claim 48, further comprising means responsive to said video signal for storing said video signal.

59. The apparatus as recited in claim 58, wherein storing means is an electronic memory.

60. The apparatus of claim 48 further comprising
a. means for providing selected topographical feature signals in accordance with the Walsh transform coefficients of selected topographical features; and
b. means for detecting a selected topographical feature by comparing said Walsh transform coefficients signal with said selected topographical feature signals.

61. The apparatus as recited in claim 60, wherein said generating means, said multiplying means, said providing means, and said detecting means are providing by a computer under stored program control.

62. The apparatus as recited in claim 60, wherein said converting means supplies said video signal in accordance with a two dimension analog array of pixels.

63. The apparatus as recited in claim 62, wherein said converting means includes means for digitizing said video signal to produce a corresponding two-dimension digital array of pixels.

64. The apparatus as recited in claim 63, wherein said converting means further includes means for thresholding said video signal to produce a corresponding two dimension binary array of pixels.

65. The apparatus as recited in claim 64, further comprising means responsive to said video signal for outputting said two-dimension binary array of pixels.

66. The apparatus as recited in claim 60, wherein said detecting means is a binary to analog correlator having inputs responsive to said Walsh transform coefficients signal and said selected topographical feature signals.

67. Apparatus, which comprises:
a. means for converting optical energy of an image into a video signal;
b. means for generating a Walsh function signal in accordance with a two-dimension Walsh function
c. means for multiplying said video signal with said Walsh function signal to produce a Walsh transform coefficients signal indicative of the decomposed spectral components of said image;
d. means for providing selected topographical feature signals in accordance with Walsh transform coefficients of selected topographical features; and
e. means for detecting a selected topographical feature by comparing said Walsh transform coefficients signal with said selected topographical feature signals including a binary to analog correlator having inputs responsive to said Walsh transform coefficents signal and said selected topographical feature signals.

68. The apparatus as recited in claim 67, wherein said generating means, said multiplying means, said providing means, and said detecting means are provided by a computer under stored program control.

69. The apparatus as recited in claim 67, wherein said converting means supplies said video signal in accordance with a two dimension analog array of pixels.

70. The apparatus as recited in claim 69, wherein said converting means includes means for digitizing said video signal to produce a corresponding two-dimension digital array of pixels.

71. The apparatus as recited in claim 70, wherein said converting means further includes means for thresholding said video signal to produce a corresponding two-dimension binary array of pixels.

72. The apparatus as recited in claim 71, further comprising means responsive to said video signal for outputting said two-dimension binary array of pixels.

73. A method comprising the steps of:
a. converting optical energy of an image into a video signal using a sensor array, said sensor providing said video signal in accordance with a two-dimension analog array of pixels
b. generating a Walsh function signal in accordance with a two-dimension Walsh function;
c. multiplying said video signal with said Walsh function signal to produce a Walsh transform coefficient signal indicative of the decomposed spectral components of said image.

74. The method as recited in claim 73, wherein said optical energy of step a is substantially in the visible light range.

75. The method as recited in claim 74, wherein said video signal is digitized to produce a corresponding two-dimension digital array of pixels.

76. The method as recited in claim 75, wherein said video signal corresponding to said two-dimension digital array of pixels is thresholded to produce a corresponding two-dimension binary array of pixels.

77. The method as recited in claim 76, further comoprising the step of outputting said video signal corresponding to said twp-dimension binary array of pixels.

78. The method as recited in claim 77, further comprising the step of storing said video signal corresponding to said two-dimensional binary array of pixels.

79. The method as recited in claim 78, wherein said step of storing utilizes an electronic memory.

80. The method as recited in claim 76, wherein said thresholding is performed at a selected signal value to reduce image background noise.

81. The method as recited in claim 80, wherein said video signal of step c is in accordance with said two-dimension binary array of pixels.

82. The method as recited in claim 81, wherein said two-dimension Walsh function of step b has at least two orders.

83. the method as recited in claim 82, wherein said multiplying of step c is performed by multiplying said video signal in accordance with said two-dimension binary array pixels by said Walsh function signal in accordance with each of said orders of said two-dimension Walsh function to provide said Walsh transform coefficients signal having a Walsh transform coefficients signal having a Walsh transform coefficient for each of said orders.

84. The method as recited in claim 83, further comprising the step of normalizing each of said Walsh transform coefficients of said Walsh transform coefficients signal.

85. The method as recited in claim 83, further comprising the step of outputting said Walsh transform coefficients signal.

86. The method as recited in claim 83, wherein said Walsh transform coefficients of said Walsh transform coefficients signal are arranged in a two-dimension array format.

87. The method of claim 73 further comprising the steps of:
 a. providing selected topographical feature signals in accordance with the Walsh transform coefficients of selected topographical features; and
 b. detecting a selected topographical feature by comparing said Walsh transform coefficients signal with said selected topographical feature signals.

88. The method as recited in claim 87, wherein step a is performed by using an area sensor array having optical energy of an image from an illuminated transparency focused on the detecting surface thereof.

89. The method as recited in claim 88, wherein said optical energy of step a is substantially in the visible range.

90. The method as recited in claim 88, wherein said area sensor array supplies said video signal in accordance with a two dimensional analog array of pixels.

91. The method as recited in claim 90, wherein said two-dimensions of said two-dimension Walsh function are substantially equal in number to the two-dimensions of said two-dimension binary array of pixels.

92. The method as recited in claim 90, wherein said video signal is digitized to produce a corresponding two-dimension digital array of pixels.

93. The method as recited in claim 92, wherein said video signal corresponding to said two-dimension digital array of pixels is thresholded to produce a corresponding two-dimension binary array of pixels.

94. The method as recited in claim 93, wherein said thresholding is performed at a selected signal level to reduce image background noise.

95. The method as recited in claim 93, wherein said video signal of step c is in accordance with said two-dimension binary array of pixels.

96. The method as recited in claim 95, wherein step c provides said Walsh transform coefficients signal in accordance with $$a(i,j) = \frac{1}{nm} \sum_{k=1}^{n} \sum_{l=1}^{m} f(k,l) Wal(i,j) Wal(j,l),$$

where: $a(i,j)$ is said Walsh transform coefficients signal; i and j indicate the order of said two-dimension Walsh function; n and m are integers; and $f(k,l)$ is said two-dimension binary array of pixels.

97. The method as recited in claim 95, wherein said two-dimension Walsh function has at least two orders; and
 wherein said multiplying of step c is performed by multiplying said video signal in accordance with said two-dimension binary array of pixels by said Walsh function signal in accordance with each of said orders of said two-dimension Walsh function to provide said Walsh transform coefficients signal having a Walsh transform coefficient for each of said orders.

98. The method as recited in claim 93, wherein said two-dimension Walsh function has at least two orders.

99. The method as recited in claim 87 further comprising the step of normalizing said Walsh transform coefficients signal.

100. The method as recited in claim 87, further comprising the step of storing in an electronic memory said video signal.

101. The method as recited in claim 87, further comprising the step of outputting said Walsh transform coefficients signal.

102. The method as recited in claim 87, wherein step e is performed by a binary-analog correlator.

103. The method as recited in claim 87, wherein steps b and e are performed by a computer under stored program control.

104. The method as recited in claim 103, wherein said computer is digital.

105. The method as recited in claim: 87, wherein said selected topographical features are substantially linear.

* * * * *